Patented Apr. 25, 1950

2,505,059

UNITED STATES PATENT OFFICE 2,505,059

2,4-D SALT AND COMPOSITION CONTAINING THE SAME

Ralph Gower Davies Moore, Phillipsburg, N. J., assignor to J. T. Baker Chemical Co., Phillipsburg, N. J., a corporation of New Jersey No Drawing. Application August 16, 1946, Serial No. 691,166

2 Claims. (Cl. 260—247)

This invention relates to a new derivative of 2,4-dichlorophenoxyacetic acid characterized by extremely high water solubility even at low temperatures, such that, by its use, stable, highly concentrated aqueous solutions containing 2,4-dichlorophenoxyacetic acid may be prepared.

The new salt of the invention is the morpholine salt,

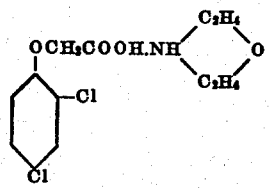

It forms white crystals, M. P. 135° C. It is readily prepared by heating the acid and the morpholine together in the presence of water. It is extremely soluble in water, its solubility ranging up to almost 70% at room temperature (20° C.). At 0° C., it solubility is over 50% and at 10° C. over 60%. The salt has the activity, from the standpoint of effect on plants to which it is applied, characteristic of 2,3-dichlorophenoxyacetic acid. Thus in dilute aqueous solution (.01%–.1% or somewhat more based on the 2,4-dichlorophenoxyacetic acid content) it is useful as a plant hormone or auxin, or as a herbicide or weed killer, its method of use and concentration at the time of use being similar to those of the 2,4-dichlorophenoxyacetic acid preparations presently being used for these purposes.

The preparation of the salt will be illustrated by the following example, but the invention is not limited thereto:

4000 grams of 2,4-dichlorophenoxyacetic acid, 1 liter of water and 1680 ml. of morpholine were placed in a vessel in the order stated and heated. The hot solution was filtered and cooled. The product which separated was filtered off, washed with several small portions of cold water, and dried at 50° C. 3297 grams of the white crystalline material, M. P. 135° C. were obtained, and a further yield was obtained by concentrating the mother liquor.

I claim:
1. The morpholine calt of 2,4-dichlorophenoxyacetic acid.
2. An aqueous solution of the morpholine salt of 2,4-dichlorophenoxyacetic acid.

RALPH GOWER DAVIES MOORE.

REFERENCES CITED

The following references are of record in the file of this patent:

UNITED STATES PATENTS

| Number | Name | Date |
|---|---|---|
| 2,163,181 | Ulrich | June 20, 1939 |
| 2,396,513 | Jones | Mar. 12, 1946 |

FOREIGN PATENTS

| Number | Country | Date |
|---|---|---|
| 650,380 | Germany | June 1, 1935 |

OTHER REFERENCES

Textbook of Organic Chemistry by G. H. Richter, 1938 edition, Wiley, p. 235.

Synthetic Organic Chemicals, 12th edition, pp. 75–76 (1945), Carbide and Carbon Chemical Corp.